United States Patent [19]

van Ommering et al.

[11] 4,107,395
[45] Aug. 15, 1978

[54] OVERCHARGEABLE SEALED METAL OXIDE/LANTHANUM NICKEL HYDRIDE BATTERY

[75] Inventors: Gerrit van Ommering, Chevy Chase; James D. Dunlop, Gaithersburg, both of Md.

[73] Assignee: Communication Satellite Corporation, Washington, D.C.

[21] Appl. No.: 834,946

[22] Filed: Sep. 20, 1977

[51] Int. Cl.² .................................................. H01M 10/34
[52] U.S. Cl. .................................................. 429/21; 429/27
[58] Field of Search .................. 429/21, 27, 40, 57

[56] References Cited

U.S. PATENT DOCUMENTS

| | | | |
|---|---|---|---|
| 3,850,694 | 11/1974 | Dunlop et al. | 429/21 |
| 3,874,928 | 4/1975 | Will | 429/57 |
| 3,959,018 | 5/1976 | Dunlop et al. | 429/40 |

*Primary Examiner*—John H. Mack
*Assistant Examiner*—H. A. Feeley

*Attorney, Agent, or Firm*—Sughrue, Rothwell, Mion, Zinn and Macpeak

[57] ABSTRACT

This invention relates to improvements in the construction of metal oxide/lanthanum nickel hydride storage batteries. A stack construction is disclosed which allows recombination of oxygen before it reaches the hydride electrode. The oxygen gas is forced to escape from the back of the metal oxide electrode where it is reduced at a catalyst electrode held at the potential of the lanthanum nickel electrode. With rapid recombination, no build-up of pressure occurs and no oxygen gas will arrive at the hydride electrode which would tend to damage it. In one embodiment, the hydride electrode is separated from the metal oxide electrode by a fuel cell-type separator. In one embodiment, a single oxygen reduction electrode is placed between two back-to-back metal oxide electrodes, and the reduction electrode is connected to the two common leads to the hydride electrodes. In a second embodiment, the reduction electrodes are pressed against or attached to the hydride electrodes.

17 Claims, 2 Drawing Figures

OVERCHARGEABLE SEALED METAL OXIDE/LANTHANUM NICKEL HYDRIDE BATTERY

BACKGROUND OF THE INVENTION

1. Field of the Invention

This invention relates to rechargeable metal oxide/lanthanum nickel hydride storage batteries.

2. Prior Art

The prior art is replete with patents dealing with systems which store hydrogen as a reduced compound rather than a gas at higher pressures within the cell chamber. The use of hexagonal intermetallic compounds of the generalized composition $AB_5$, where A represents a rare-earth metal and B represents nickel or cobalt, have been suggested since they are known to easily absorb and desorb large quantities of hydrogen gas under relatively small pressures at ambient conditions. The rare-earth metal has generally been lanthanum, although other rare-earth metal compounds may be used for hydrogen storage. Prior art secondary batteries utilizing lanthanum nickel are shown in U.S. Pat. Nos. 3,850,694, Dunlop, et al.; 3,874,928, Will; and 3,959,018, Dunlop, et al. The hallmark of prior art batteries as typified by the latter two patents is the use of a solid positive electrode, and a spaced hydrogen gas diffusion negative electrode of lanthanum nickel spaced from the cathode having various degrees of immersion in an alkaline electrolyte. In the '694 patent, the variation is shown wherein the hydride is stored on the walls of the pressure container and not a part of the assembled electrode stack.

In copending U.S. application Ser. No. 782,158, a basic modification is shown wherein the lanthanum nickel forms a part of the negative electrode by the use of an unalloyed composition of $LaNi_5$. Accordingly, in these systems, lanthanum nickel, as the hydrogen storing agent, is shown to be a part of the substantive electrode stack.

Several problems have occurred with these prior art constructions. In the case of the metal oxide/$LaNi_5 Hx$ cell according to the construction shown in Will ('928), the metal oxide and hydride electrodes are completely immersed in the alkaline electrolyte, generally KOH. The hermetically sealed cell of that construction has exhibited problems due to oxygen and hydrogen build-up during overcharge, as well as the problem of contamination of the hydride electrode by oxygen. The first problem, oxygen and hydrogen build-up, is not dealt with adequately in the prior art since it is assumed that the hydride will store excess hydrogen during overcharge. The essential problem of avoiding excess pressure build-up within the cell is one requiring matching the state of the charge of both electrodes so that they reach full charge at the same time. Hence, all the gas produced will be recombined as charging proceeds. The prior art does not account for the problem and, accordingly, consideration of potential solutions is not found.

The problem of contamination is one where the hydride electrode is corroded by the presence of oxygen thereby reducing its capacity. Clearly, the problem of contamination of the hydride electrode contributes to the corollary problem of hydrogen build-up since the decrease in efficiency of the hydride electrode carries with it the commensurate decrease in storage capacity of hydrogen.

A second type of construction utilizes an electrode stack similar to that found in NiCd cells. A porous separator, partially wetted with electrolyte, is placed between adjacent metal oxide and hydride electrodes. This is shown in the copending U.S. application Ser. No. 782,185. Oxygen produced during overcharge at the metal oxide electrode will diffuse through the separator to recombine with hydrogen at the hydride electrode. While the problem of oxygen build-up is avoided, this solution compromises the integrity of the cell by considerable corrosion of the hydride material itself.

Accordingly, the problem of recombination of oxygen, during overcharge, remains a significant area of research in metal oxide/rare-earth hydride secondary batteries. Within the prior art, the use of reducing electrodes, alternatively known as auxiliary or oxygen-consuming electrodes, have been established in other types of batteries, primarily nickel cadmium batteries. Oxygen build-up within nickel cadmium batteries is reduced by the use of an oxygen-consuming electrode used to form a hydroxide ion. References such as Seiger, U.S. Pat. No. 3,350,225, show the use of a consuming electrode in the context of nickel cadmium battery technology. Hence, the prior art Seiger patent relates to a rechargeable field dry cell secondary battery. The plates therein undergo reversible chemical reactions of oxidation and combination during charge and discharge, and the electrolyte is impregnated in the separator between the plates. Seiger specifically utilizes a porous oxygen-consuming electrode within the casing such that, during overcharge, the additional water which is generated as a consequence of the chemical reaction spreads over the surface area of the oxygen-consuming electrode. By means of terminals connecting the oxygen-consuming electrode to the negative terminal of the battery, the oxygen generated at each positive plate will migrate to the area of the oxygen-consuming electrode where it is then consumed at the surface at a rate preventing excessive pressure build-up within the sealed casing.

In the nickel cadmium battery technology, the reduction of oxygen build-up has been addressed as typified by Seiger. However, complete scavenging of oxygen gas is an unnecessary consideration since the cadmium electrode is not damaged by oxygen as opposed to a hydride electrode. Furthermore, the simultaneous avoidance of oxygen and hydrogen build-up is unnecessary in this system. Accordingly, in the particular technology of Seiger, the use of a scavenging electrode for purposes of reducing generated oxygen to water provides a common solution to the area of unwanted oxygen build-up. In terms of avoidance of both oxygen and hydrogen pressures, the prior art is totally devoid of any considerations in the context of the metal oxide/rare-earth nickel hydride secondary battery. The problem appears to be addressed in the context of a different battery disclosed in Yehiely, U.S. Pat. No. 3,470,025. In the context of an entirely different type of system utilizing alkaline battery cells, a control cell is provided in the Yehiely patent responsive to voltage rises above threshold levels representing predetermined discharge conditions. The control cell is utilized for reducing the discharge current from the serially connected cells to a safe level thereby suppressing the tendency towards damage. However, Yehiely is not concerned with the particular battery technology utilized herein.

SUMMARY OF THE INVENTION

The present invention solves the problem of both hydrogen build-up and oxygen build-up by forcing oxygen gas to escape from the back of the metal oxide electrode in the metal oxide/rare-earth nickel cell where it is reduced at a catalyst electrode held at the potential of the rare-earth nickel electrode. Because reduction is rapid, no build-up of pressure will occur, and no gaseous oxygen will arrive at the hydride electrode tending to damage it. Accordingly, a cell is produced having an improved life capability with safety characteristics much superior to those of prior art cells.

Accordingly, it is an object of this invention to provide for an improved metal oxide/lanthanum nickel hydride storage battery.

It is another object of this invention to improve existing metal oxide/lanthanum nickel hydride batteries by the use of improved electrode stack arrangement which forces oxygen gas to escape from the back of the metal oxide electrode.

Yet another object of this invention is to provide for an improved stack construction to avoid the excessive build-up of pressure within the cell by allowing the oxygen to be reduced at a catalyst electrode held at the same potential as the lanthanum nickel electrode.

A further object of this invention is to provide for an improved metal oxide/lanthanum nickel hydride cell which strongly reduces contamination of the hydride electrode by oxygen.

These and other objects of this invention are fulfilled in an improved electrode stack for a metal oxide/lanthanum nickel hydrogen battery which utilizes in the electrode stack a catalyst electrode which is held at the potential of the lanthanum nickel electrode. The oxygen gas formed during overcharge is forced towards the catalyst electrode by using two types of separators with widely different resistances to gas flow on opposite sides of the metal oxide electrode.

These and other objects of this invention will be apparent from a description of the preferred embodiment described herein.

DESCRIPTION OF THE PREFERRED EMBODIMENT

Figure 1:
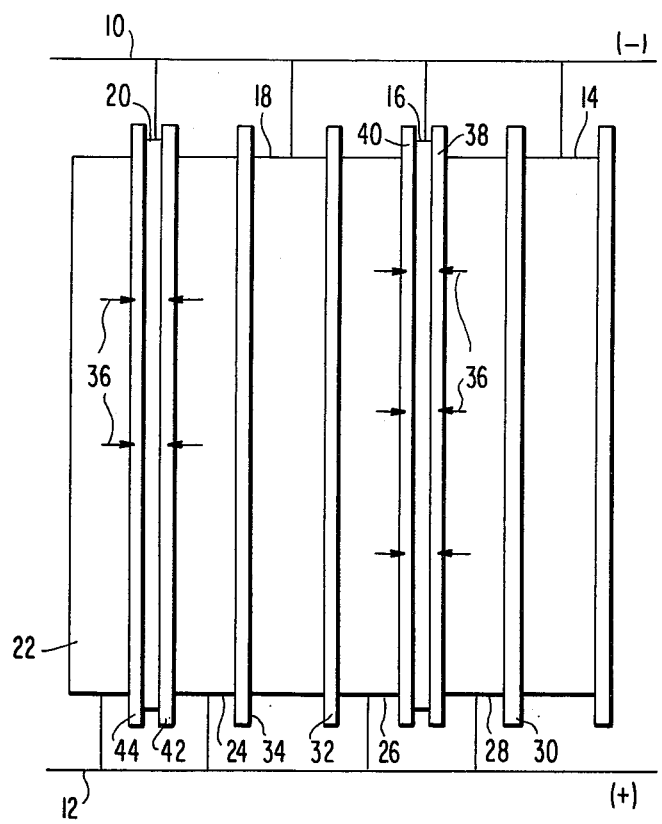
FIG. 1 is a schematic view of one preferred embodiment of an electrode stack arrangement incorporating the features of this invention.
Figure 2:
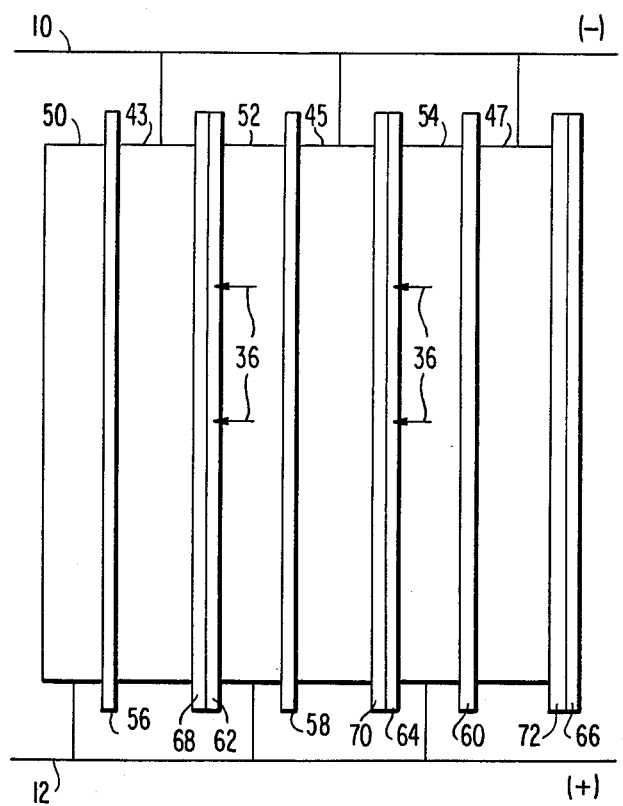
FIG. 2 is a second preferred embodiment of an electrode stack arrangement incorporating the features of this invention with the reduction electrodes pressed against or attached to the hydride electrodes.

Referring now to FIGS. 1 and 2, two electrode stack arrangements are shown which incorporate the principal features of the invention. As shown in the figures, two busbars 10 and 12 are schematically shown. The negative busbar 10 is series coupled to a first hydride electrode 14, an oxygen-reducing electrode 16, a second hydride electrode 18 and a second oxygen-reducing electrode 20. The positive busbar 12 is series coupled to a succession of metal oxide electrodes 22–28 arranged in a back-to-back arrangement. Hence, metal oxide electrodes 22 and 24 are arranged in a back-to-back arrangement enclosing oxygen-reducing electrode 20 while a second pair of metal oxide electrodes 26 and 28 are disposed in the back-to-back arrangement enclosing oxygen-reducing electrode 16.

The lanthanum nickel electrode 14, 18 can be formed in the manner consistent with that disclosed in copending patent U.S. application Ser. No. 782,158. Essentially, activated lanthanum pentanickel is utilized with the activated powder mixed with a binder such as Teflon 30 in water until it becomes dough-like in substance. The resulting mixture can be rolled over the entire surface of a nickel screen and then dried in a vacuum oven. This is followed by sintering in an inert atmosphere to complete the electrode surface. Alternatively, platinum black may be added prior to spreading to increase the rate at which hydrogen is formed directly on the electrode surface. An alternative technique for forming the electrode involves spraying an aqueous hydride-teflon dispersion onto an expanded nickel collecting screen. Sufficient build-up is obtained by spreading thin layers over the screen, and when dry, the electrode is then sintered as in the past example.

The positive metal oxide electrodes 22–28 can be fashioned in accordance with known techniques in the prior art, such as those described in "Alkaline Storage Batteries," John Wiley & Sons, Inc., 1969. The positive electrodes can be made from any conventional oxidizing agent to form the electro-chemical couple, such as nickel hydroxide, silver oxide, manganese dioxide, and mercuric oxide.

As shown in FIGS. 1 and 2, the hydride electrode 14 is separated from the metal oxide electrode 28 by means of a fuel cell-type of separator 30. Similarly, the hydride electrode 18 is separated from the metal oxide electrode 26 by a similar separator 32, and from the adjacent metal oxide electrode 24 by separator 34. These separators are generally fuel cell asbestos or a potassium titanate matrix, or any type of separator with a high bubble pressure. This is one having a low gas permeability in the wet condition. These separators remain relatively inert in the environment of the cell, and when oxygen is produced upon overcharge, that oxygen which is generated cannot penetrate the separator and reach the hydride electrode.

The separators 30–34 serve to isolate the hydride electrode during overcharge. Hence, during an overcharge condition when oxygen is produced, it will not penetrate the separator and reach the hydride electrode which would tend to corrode the hydride material therein. Instead, oxygen will emerge from the opposite side of the metal oxide electrode and flow in direction of the arrows 36 through a partially wetted separator 38–44 to an oxygen-reducing electrode 16 or 20. The partially wetted separator can be fashioned from a nonwoven nylon or polypropylene or any type of separator with a lower electrolyte affinity than both electrodes and the fuel cell-type separator. Such a separator will offer little resistance to oxygen flow and can also absorb the electrolyte expelled from the metal oxide electrode when it begins to produce oxygen.

Accordingly, by proper choice of separators, the hydride electrode is isolated during overcharge by means of separators 30–34 while escape of oxygen from the metal oxide electrode is facilitated by the partially separated electrode 38–40.

The oxygen-reducing electrode 16 must contain a material which has poor characteristics as a hydrogen electrode but good characteristics as an oxygen cathode when held at the potential of the hydride electrode. Accordingly, carbon black is one material which will satisfy the requirement, and as shown in FIG. 1, the oxygen-reducing electrode is electrically coupled to the anode 10, thereby electrically connecting it to the hydride electrodes.

During normal charging of the cell, and subsequent discharging, the polarization of the hydride electrode 14 is very small. Accordingly, with this small over-voltage imposed on itself, the oxygen-reducing electrode 16 will pass a negligible current and will not interfere with the operation of the hydride electrode.

In contrast, the imposed over-voltage for oxygen reduction is very large, and oxygen which reaches the reduction electrode 16 through the non-woven separator 38-40 will be immediately reduced according to the reaction.

$$O_2 + 2H_2O + 4e^- \rightarrow 4OH^-$$

The current use for the oxygen reduction function will accordingly reduce the current to the hydride electrode 14, 18, and the charge current will continue to decrease to almost 0 as the metal oxide electrode proceeds to full overcharge. Hence, by designing the cell so that the metal oxide electrode reaches full charge before the hydride electrode, build-up of hydrogen pressure can be avoided. Thus, upon overcharge, two distinct advantages are attained: (1) oxygen is prevented from contacting the hydride electrode by appropriate separator function; and (2) both hydrogen build-up and oxygen build-up are avoided.

Upon over-discharge, the metal oxide electrode will produce hydrogen if the cell is designed so that this electrode exhausts its capacity before the hydride. This hydrogen as produced will then be absorbed by the partially depleted hydride electrode and a stable condition will be reached. To achieve this condition upon over-discharge, it is necessary that the hydride electrode pores be only partially filled with electrolyte so that the gas can readily react. Typically, KOH is used as an electrolyte.

As can be seen, the embodiment shown in FIG. 1 uses one oxygen-reducting electrode between two back-to-back metal oxide electrodes. Hence, typically, the oxygen-reducing electrode 20 is placed between the metal oxide electrodes 22 and 24, with a second electrode 16 placed between metal oxide electrodes 26 and 28. An electrode stack utilizing this back-to-back construction can accordingly be fabricated with the reduction electrode connected to the common leads of the hydride electrodes as shown in FIG. 1.

A variation of the back-to-back construction is shown in FIG. 2 wherein the reduction electrodes are pressed against or attached directly to the hydride electrodes. In the construction shown in FIG. 2, three hydride electrodes 43, 45 and 47 are shown with metal oxide electrodes 50-54 separated from the hydride electrode by a fuel cell-type separator 56-60. As indicated, the oxygen-reducing electrode is placed directly against the hydride electrode, and a non-woven nylon separator 62-66 is employed. The oxygen-reducing electrodes are shown as elements 68-72. Since back-to-back construction is not utilized, oxygen would cross the non-woven nylon separators in the direction shown by arrows 36. However, isolation is achieved by utilizing the fuel cell-type separator 56-60 on one side of the hydride electrode and having the oxygen-reducing electrode 68-72 providing isolation on the other side of the hydride electrode.

In either case, it is desirable to seal the edges of the positive electrode — that is the metal oxide electrode— with a polymer material in order to prevent oxygen exiting from the sides yet not prohibiting it from reaching the reduction electrode. This can be accomplished by a polymer coating or providing a tab on the fuel cell-type separator to encase the metal oxide electrode.

It is readily apparent that other modifications of the two preferred embodiments can be utilized. One possible arrangement would involve placing a reduction electrode on both faces of the hydride electrode and then using one negative electrode. The negative electrode is then simply alternated with positive electrodes from which they are separated by means of non-woven nylon separators thereby eliminating the fuel cell separators entirely from the stack. While this technique may reduce stack volume, it is less desirable than either of the two preferred embodiments because the reduction electrode tends to impede the normal charge/discharge reaction by being interposed between the positive and negative electrodes.

In either situation, the positive electrode may be made from any metal oxide electrode, such a hydroxide, silver oxide, manganese dioxide, or others where the active material is located in a porous conductive support of the type previously described. Lanthanum nickel hydride, forming the negative electrode, is fabricated by polymer bonding hydride particles to a nickel screen or by placement of those particles on a perforated metal container, also as described. The oxygen-reducing electrode which contains carbon or another appropriate catalyst is polymer bonded onto a nickel screen, and it is indicated that this structure should be somewhat hydrophobic. Hence, using this type of construction, the components should rank in terms of capillary attraction by having the oxygen-reducing electrode, least attractive, followed by the nylon separator, the positive electrode, the hydride electrode roughly equal to the positive electrode and the fuel cell-type separator last. A conventional prismatic construction can be utilized with the stack placed in hermatically sealed containers resistant to the electrolyte and insulated with feedthroughs for the positive and negative terminals.

What is claimed is:

1. In a metal oxide-hydride electrode storage battery with an electrode stack having a metal oxide positive electrode and a lanthanum nickel hydride negative electrode, said positive and negative electrodes separated by separator means including separators of two widely different resistances to gas flow disposed on opposite sides of said positive electrode, the improvement comprising an oxygen reduction catalytic electrode disposed in said electrode stack adjacent said metal oxide electrode and held at the same potential as said negative hydride electrode.

2. The battery of claim 1 wherein a separator of low oxygen gas permeability is disposed on each side of said hydride electrode.

3. The battery of claim 2 wherein said separator is selected from the group consisting of fuel cell asbestos and potassium titanate matrix.

4. The battery of claim 1 wherein said oxygen electrode is placed between two metal oxide electrodes and separated therefrom by separators having a lower electrolyte affinity than said electrodes.

5. The battery of claim 4 wherein said separators are selected from the group consisting of non-woven nylon and polypropylene.

6. The battery of claim 5 wherein said oxygen electrode comprises carbon black bonded to a nickel screen.

7. The battery of claim 4 wherein each of said metal oxide electrodes is separated from said lanthanum hydride electrode by separators of low oxygen gas permeability.

8. The battery of claim 2 wherein said positive electrode is separated from said negative electrode by a separator of low oxygen gas permeability.

9. The battery of claim 1 wherein said positive electrode is separated from said negative electrode by said oxygen reduction electrode and a separator having a lower electrolyte affinity than said electrodes.

10. The battery of claim 9 wherein said separator is disposed between said oxygen reduction electrode and said metal oxide positive electrode.

11. The battery of claim 1 including means to force oxygen produced in said battery toward said oxygen reduction electrode.

12. The battery of claim 11 wherein said means to force oxygen comprises a first type of separator on one side of said positive electrode and a second type of separator on the opposite side of said positive electrode, said first type of separator having a greater capillary attraction than said second type of separator.

13. The battery of claim 12 wherein separators of said second type are disposed on opposite sides of said oxygen reduction electrode.

14. The battery of claim 12 wherein separators of said first type are disposed on opposite sides of said hydride electrode.

15. The battery of claim 12 wherein said positive electrode is separated from said negative electrode by a separator of said first type.

16. The battery of claim 12 wherein said oxygen reduction electrode is separated from said positive electrode by a separator of said second type.

17. The battery of claim 1 wherein said oxygen reduction electrode is disposed adjacent to said negative electrode.

* * * * *